April 5, 1949.  O. J. HUELSTER  2,466,546
THREADED INSERT
Filed Feb. 3, 1943
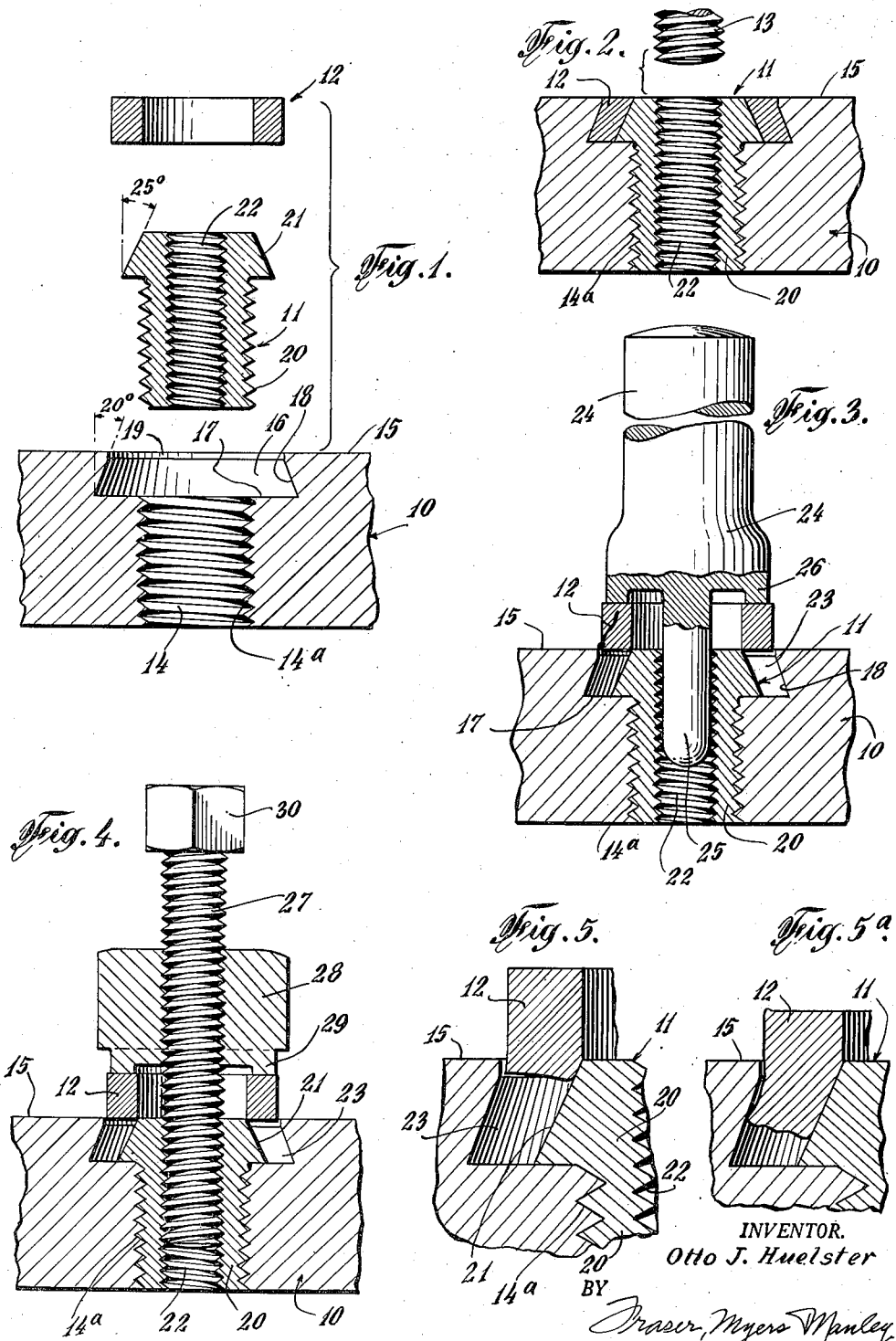
INVENTOR.
Otto J. Huelster
BY
Fraser, Myers Manley
ATTORNEYS

UNITED STATES PATENT OFFICE 2,466,546

THREADED INSERT

Otto J. Huelster, Waterbury, Conn., assignor to Scovill Manufacturing Company, Waterbury, Conn., a corporation of Connecticut Application February 3, 1943, Serial No. 474,515

4 Claims. (Cl. 85—32)

My present invention relates to a threaded insert adapted for application and use wherein threads have been stripped from soft metal and it is desired to make a new thread connection at that point, or where it is desired to secure a permanent threaded connection of great strength with a relatively soft metal part or with a fibrous, brick-like or plastic material from the face thereof.

The general objects of my invention are to provide a threaded insert of the character and for the purposes set forth, which will be simple in construction, which will be easy to install, which will have great strength and which will resist all tendencies to work loose or become disengaged from the support to which it is applied.

The foregoing, and other objects not specifically enumerated, I accomplish by employing a frusto-conical or pyramidal headed insert member which is preferably screw-threaded, forming in the supporting member a recess for receiving a part of the insert member, and an enlarged conical undercut socket adjacent the surface to which the attachment is to be made, the angle of taper of the socket wall being preferably somewhat less than the angle of taper on the headed member, positioning the headed insert member into the supporting member and filling the annular space between the tapered walls of the headed member and the socket wall with a sealing ring. The invention will be better understood from the detailed description which follows, when considered in connection with the accompanying drawings, wherein—

Figure 1 is a composite axial section showing a support, an insert and a sealing ring prior to assembly, embodying my invention.

Fig. 2 is an axial section showing the insert mounted and locked within the support by the sealing ring.

Figs. 3 and 4 show axial sections two methods of applying the sealing ring to the insert after the latter is mounted in the support.

Figs. 5 and 5a are enlarged detailed sections showing the progressive entry of the sealing ring into sealing relation to the insert and the support in the course of sealing the parts together.

Referring to the drawings, the three members which may be said to comprise the threaded insert assembly are a supporting member 10, an insert member 11 and a sealing ring 12.

The supporting member 10 to which the insert 11 and the sealing ring 12 are to be applied, may be formed of a relatively soft metal such as aluminum, magnesium or alloys thereof, or of any fibrous, brick-like or plastic material to which it is desired to firmly attach another member (not shown) through the medium of a threaded member, such as 13. Said supporting member is formed with an opening 14 which may extend either partly or completely through said member and said opening is preferably tapped to provide a relatively coarse screw-thread 14a therein. Adjacent the face 15 of the supporting member and coaxial with the opening 14 there is formed an undercut socket 16 having a base 17 and an undercut conical wall 18. The angle of taper of said undercut wall is preferably approximately 20°, and to preclude the presence of a sharp edge at the entrance to said undercut socket 16 the meeting edge formed by the tapered wall 18 and the surface 15 of the supporting member may be cut away to provide a short cylindrical surface 19.

The insert member 11 is preferably formed of a relatively hard and tough material such as steel or brass and is herein shown in the form of a headed stud, the shank 20 of which has an external diameter which is coarsely threaded to engage the screw-threads 14a in the supporting member and the head of which has the form of a frustum of a cone, the conical surface 21 of which tapers inwardly toward the axis from the base of the head to the top thereof. The angle of taper of the surface 21, herein shown as being 25°, is preferably slightly greater than the angle of taper of the undercut conical wall 18, for a purpose which will presently appear. If desired, the insert member 11 may be formed with an axial bore extending either partly or completely therethrough, which bore is preferably provided with a screw-thread 22 which is relatively finer than the external threads on said member.

The sealing ring 12 is preferably formed of relatively soft metal such as aluminum, lead or the like, and is in the form of a cylindrical annulus, the exterior diameter of which is slightly smaller than the diameter of the cylindrical surface 19 in the supporting member, and the internal diameter of which is approximately equal to the smallest diameter of the conical surface 21 on the insert member. The height of the sealing ring is such that when it is force-fitted into the annular space 23 provided between the head of the stud member and the conical undercut wall 18 of the socket 16 when the stud member has been screwed home into the supporting member, it will substantially fill said annular space.

It is a known fact that when a cylindrical ring is forcibly driven over a conical surface that the leading end of the ring becomes reduced in wall thickness, and to take care of this reduction in wall thickness as the sealing ring is deformed without resorting to excessive deforming pressure upon the sealing ring, the annular space 23 is made of smaller width at the base than at the top, which dimensioning is brought about by the difference in the angles of taper of the facing tapered surfaces on the head of the insert and on the conical wall of the socket. The dimension at the base of the annular recess 23 should, in fact, be less than the thickness of the sealing ring as the result of the thinning out action when driven over the conical head of the insert, so that there will be actually a substantial pinching effect upon said sealing ring aside from the normal flaring distortion and thinning thereof. Because of the relationship and dimensions of parts above described, any attempt to remove the insert or for the insert to become loosened after being locked in place by the force-fitted deformed ring 12 will only bind the head of the insert to a greater degree against the adjacent wall of the sealing ring, which, in turn, is backed up by the undercut surface of the supporting member.

In Fig. 3 I have shown one manner of means by which the sealing ring 12 may be assembled to lock the insert in place. As therein shown, the force-fitting and deformation of the sealing ring is accomplished by delivering a few hammer blows to a punch such as 24 provided with a rod-like guide or pilot pin 25. To preclude any direct engagement by the punch with either the top surface of the supporting member or the head of the insert member after the ring has been driven home in the space 23, the punch 24 at its sealing ring engaging end is formed with an annulus 26 of a width to engage concentrically between the cylindrical walls of the sealing ring. Of course, a force-applying punch such as disclosed in Fig. 3 can only be used where the supporting member is strong enough to withstand the rather severe hammer blows.

In Fig. 4 I have shown means and a method for applying force in an axial direction to the top of the sealing ring where the supporting member is relatively weak and incapable of withstanding severe hammer blows. The method of force-fitting the ring 12 into the annular space 23 in accordance with the disclosure of Fig. 4 is as follows: After the insert has been screwed home into the supporting member, the sealing ring is disposed on the conical head of the insert and a threaded assembly screw 27 having a traveling nut 28 thereon is screwed into the threaded bore 22 of the insert member. Preferably the traveling nut is of a special design and has an annulus 29 similar in all respects to the annulus 26 of the hammer punch 24. This annulus 29 is brought into abutting relation to the top face of the sealing ring, after which, by holding the assembly screw with a wrench or equivalent means engaging the head 30 thereof and then turning the nut 28 with a second wrench, the sealing ring 12 will be forced down into the tapered socket 23 to lock the insert member and supporting member in assembled relation.

In Figs. 5 and 5a I have shown on a somewhat enlarged scale the progressive deformation of the sealing ring as it is forced into the tapered annular space 23.

Instead of employing a sealing ring 12 of relatively soft metal and force-fitting it into the annular space 23, it will be apparent that the sealing ring may be provided by filling the annular space with a molten metal or with the plastic composition, which will harden in situ. It will also be apparent that instead of forming the enlargement on the insert 11 with a frusto-conical surface, the surface of said enlargement may be of frusto-pyramidal or other tapered form, and by the same token the wall 18 of the undercut socket 16 may likewise be of frusto-pyramidal or other tapered form, or may even be formed with an undercut groove or with recesses for anchoring the sealing ring in the annular space between the enlargement on the insert and the wall of the socket.

Accordingly, from the foregoing detailed description it will be apparent that the threaded insert, supporting member and sealing ring assembly which I have disclosed fulfills the various objects of the invention set forth in the opening statement of this specification, and while I have shown and described certain preferred embodiments of my invention, I do not wish to be limited to the specific details disclosed since it will be apparent that changes therein may be made within the range of engineering skill without departing from the spirit of my invention.

What I claim is:

1. An assembly comprising a supporting member having extending inwardly from its surface a socket having an undercut wall portion and an axial opening extending inwardly from the base of said socket, an insert having a tapered enlargement of smaller maximum diameter than the diameter of the socket at the surface of the member, the enlargement of said insert seating on the base of said socket with the tapered surface extending in the same direction as the tapered wall of the socket and forming an annular space between the enlargement and the undercut wall portion of the socket, cooperating means on said insert and on the wall of the axial inwardly extending opening in the supporting member for holding the insert to the supporting member, a sealing ring substantially filling said annular space and permanently retaining said insert against displacement from said supporting member, and said insert having means for attaching a member therewith.

2. An assembly comprising a supporting member having extending inwardly from its surface a socket having an annular undercut wall portion and an internal relatively coarse threaded opening extending axially inwardly from the base of said socket, an insert having a tapered enlargement of smaller maximum diameter than the diameter of the socket at the surface of the member, the enlargement of said insert seating on the base of said socket with the tapered surface extending in the same direction as the tapered wall of the socket and forming an annular space between the enlargement and the undercut wall portion of the socket, said insert having a threaded shank engaging in the threaded opening, a sealing ring filling said annular space and permanently retaining said insert against displacement from said supporting member, and said insert having means for attaching a member therewith.

3. An assembly according to claim 1 wherein the enlargement on the insert is of frusto-conical form and constitutes the head of said insert which is disposed wholly within the socket in the supporting member.

4. An assembly according to claim 1 wherein the enlargement on the insert constitutes the head of said insert which is disposed wholly within the socket in the supporting member and wherein the insert has a relatively fine internal thread extending axially through the head which internal thread constitutes the means for attaching a member to the insert.

OTTO J. HUELSTER.

REFERENCES CITED

The following references are of record in the file of this patent:

UNITED STATES PATENTS

| Number | Name | Date |
| --- | --- | --- |
| 321,054 | Ritter | June 30, 1885 |
| 452,640 | Gerry | May 19, 1891 |
| 577,737 | Flaherty | Feb. 23, 1897 |
| 726,070 | Keen | Apr. 21, 1903 |
| 889,966 | Rausch | June 9, 1908 |
| 1,030,146 | Wade | June 18, 1912 |
| 1,145,256 | Mochow | July 6, 1915 |
| 1,238,915 | Hohorst | Sept. 4, 1917 |
| 1,251,676 | McCaffray | Jan. 1, 1918 |
| 1,298,398 | Purple | Mar. 25, 1919 |
| 1,328,401 | Savidge | Jan. 20, 1920 |
| 1,621,598 | Phillips | Mar. 22, 1927 |
| 1,705,793 | Wheeler | Mar. 19, 1929 |
| 2,002,741 | Hunt | May 28, 1935 |
| 2,203,219 | Jackman | June 4, 1940 |
| 2,371,927 | Schmidt et al. | Mar. 20, 1945 |
| D. 31,749 | North | Oct. 31, 1899 |

FOREIGN PATENTS

| Number | Country | Date |
| --- | --- | --- |
| 314,894 | Germany | Oct. 16, 1919 |